United States Patent [19]

Miller

[11] Patent Number: 5,382,952
[45] Date of Patent: Jan. 17, 1995

[54] TRANSPONDER FOR PROXIMITY IDENTIFICATION SYSTEM

[75] Inventor: Kevin D. Miller, San Jose, Calif.

[73] Assignee: Indala Corporation, San Jose, Calif.

[21] Appl. No.: 823,784

[22] Filed: Jan. 22, 1992

[51] Int. Cl.⁶ ............................................. G06K 7/00
[52] U.S. Cl. ........................... 340/825.54; 340/825.31; 340/572; 235/440
[58] Field of Search ....................... 340/825.54, 825.31, 340/568, 572, 941; 342/44, 45, 42, 51; 235/382, 435, 440, 492, 488, 449

[56] References Cited

U.S. PATENT DOCUMENTS

| | | | |
|---|---|---|---|
| 4,353,064 | 10/1982 | Stamm | 340/825.31 |
| 4,818,855 | 4/1989 | Mongeon et al. | 235/440 |
| 5,028,918 | 7/1991 | Giles et al. | 340/825.54 |
| 5,175,418 | 12/1992 | Tanaka | 235/439 |

Primary Examiner—Donald J. Yusko
Assistant Examiner—Edward Merz
Attorney, Agent, or Firm—Spencer, Frank & Schneider

[57] ABSTRACT

A transponder for use in an object identification system including an interrogator which transmits a continuous interrogation signal and detects a responsive identification signal transmitted by the transponder. The transponder receives and detects the interrogation signal and, in response to receipt of the interrogation signal, produces a repeating identification signal having a fixed number of binary bits consisting of an identification data portion of a specified number of consecutive bits less than one half of the fixed number of bits, and a synchronization pattern of consecutive bits consisting of first, second and third bits of alternating binary values, a consecutive sequence of a plurality of bits which are all of the same binary value as the second bit, and a single bit of the same binary value as the first and third bits. The identification signal is modulated onto a carrier signal and transmitted. Preferably, the first, second and third bits and the sequence of a plurality of bits constitute one half of the fixed number of binary bits of the identification signal, with the binary value of the first bit being a binary 1.

14 Claims, 2 Drawing Sheets

TRANSPONDER FOR PROXIMITY IDENTIFICATION SYSTEM

BACKGROUND OF THE INVENTION

The present invention relates to an improved transponder for a proximity identification system. More particularly, the present invention relates to an improved transponder for an identification system of the type wherein an interrogator, located for example at a fixed installation, transmits an interrogating signal to activate a portable transponder type device or tag, which would ordinarily be carried by a person, an animal or an object, which is in the vicinity or proximity of the interrogator to cause the transponder to produce and transmit a coded identifying signal to a receiver conventionally located at the same location as the interrogator. The receiver, upon detection of a valid identifying code from the transponder then activates some system function, for example, to provide access to a controlled area or to keep track of the person, animal or object.

In such proximity systems, the interrogating or activating signal is conventionally a continuous signal of a predetermined frequency which is inductively coupled to the transponder by means of an electromagnetic coupling arrangement and which supplies power to the transponder. The transponder, in turn, continuously produces its unique identifying signal for as long as it is activated, and transmits same back to the receiver by modulating a carrier, of a frequency different than the interrogating frequency, with the coded information signal. The output signal of the transponder is in turn inductively coupled to the receiver either by means of a magnetic field, an electrostatic field or simultaneously by both a magnetic and an electrostatic field as disclosed, for example, in copending allowed commonly assigned U.S. patent application Ser. No. 07/453,271, filed Dec. 18, 1989(now U.S. Pat No. 5,099,227 issued Mar. 24, 1992), the subject matter of which is incorporated herein by reference.

As indicated above, upon being activated, the transponder continuously produces and transmits an output signal containing its unique identifying code. Accordingly, in order to be able to detect the code in the receiver, it is likewise necessary for the transponder to produce and include in its output signal a synchronizing signal or pattern. While various types of synchronizing signals or patterns for such transponders are known, the known synchronizing pattern suffer from a number of disadvantages. Such disadvantages include, for example, the need to provide specific additional circuitry for generating the synchronizing signal or pattern, difficulty in detecting the synchronizing pattern, and falsification of the synchronizing pattern by external noise.

SUMMARY OF THE INVENTION

It is therefore an object of the present invention to provide an improved transponder of the above mentioned type which produces an identification signal containing a novel synchronization pattern which overcomes the above disadvantages.

The above object is generally achieved according to the present invention by a transponder for use in an object identification system including an interrogator which transmits a continuous interrogation signal and detects a responsive identification signal transmitted by the transponder, with the transponder comprising: means for receiving and detecting the interrogation signal; means, responsive to receipt of the interrogation signal, for continuously producing an identification signal having a frame with a fixed number of binary bits including a start bit corresponding to a first binary value, an identification data portion of a specified number of bits less than one half of the fixed number of bits, and a following synchronization portion including first, second and third consecutive bits of alternating binary values, with the first and the third bits being of the first binary value and the second bit being of a second binary value, followed by a sequence of bits which are all of the second binary value to complete the frame; means for producing a carrier signal; and means for modulating the carrier signal with the identification signal and for transmitting the modulated carrier signal.

Preferably, the bits in the synchronization portion constitute one half of the fixed number of bits of the frame, the first binary value is a binary 1, and the fixed number of bits is equal to 64 or 128.

DETAILED DESCRIPTION OF THE PREFERRED EMBODIMENTS

Figure 1:
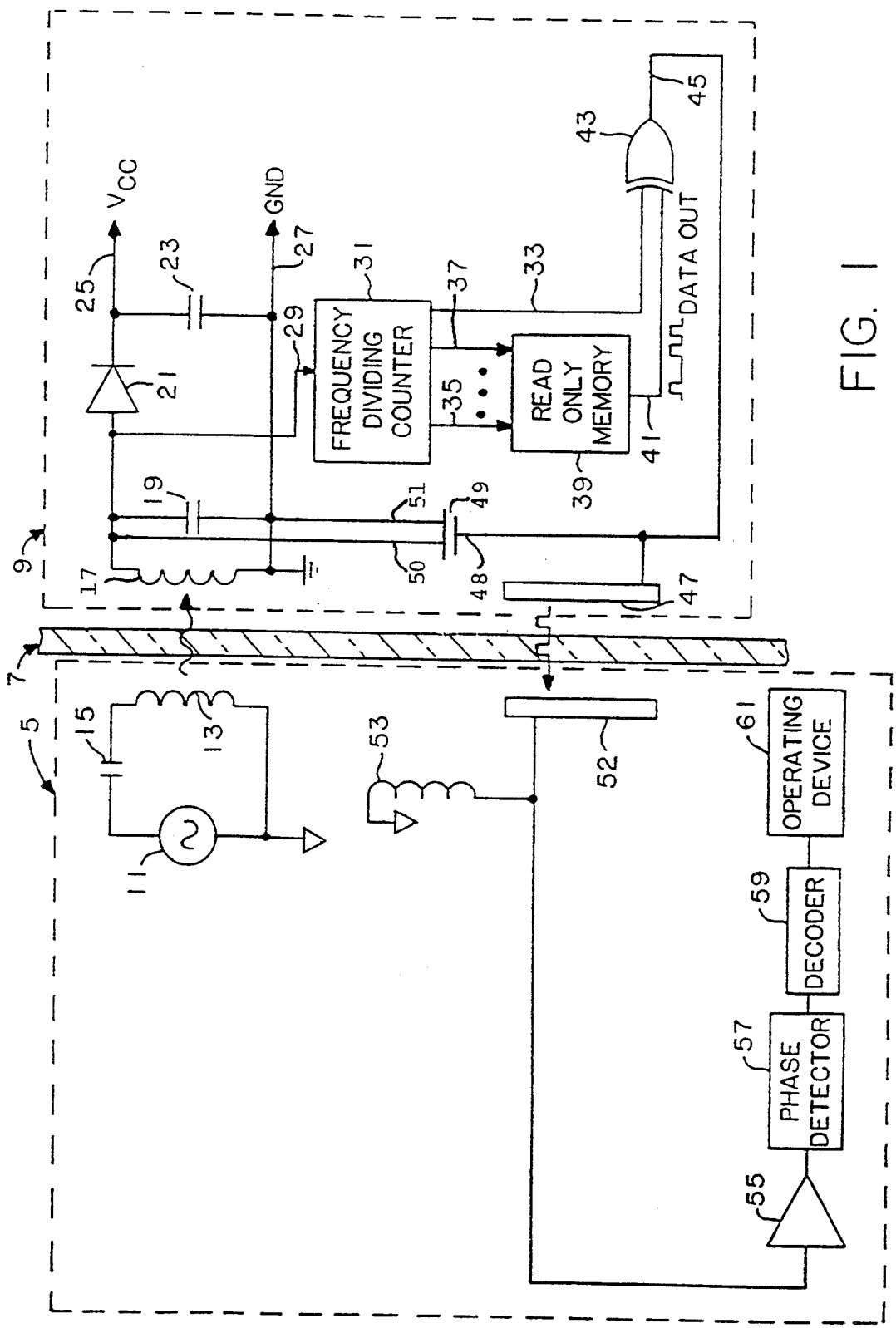
FIG. 1 is block circuit diagram of a proximity identification system.

Referring now to FIG. 1 there is shown a proximity identification system wherein reference numeral 5 designates the circuitry of the interrogator and receiver disposed at a fixed installation, for example mounted on a convenient structure 7, such as a wall, a window, a floor or on the ground, etc. The remainder of the circuitry shown in FIG. 1 is contained in a portable transponder type unit 9, e.g. a card or tag, which, for example, is disposed on a person, animal, vehicle, etc. so that it can be brought into proximity of the interrogator/reader 5 for detection.

The exciter or interrogator circuit, which likewise functions as a power supply, consists of an oscillator 11, which puts out power at a convenient frequency $f_0$, e.g. 400 or 125 kHz, and which is connected to a transmit coil antenna 13 tuned to resonate at the output frequency of oscillator 11 by means of a capacitor 15. Coil 13 emits a strong electromagnetic field and is optionally provided with a Faraday shield to avoid capacitive or electrostatic coupling to the receiver portion of the transponder unit 9.

The transponder unit or tag 9 includes a receive antenna or coil 17 and a parallel connected capacitor 19 which form a tuned LC circuit which is resonant at the frequency $f_0$ of the oscillator 11. A half wave rectifier circuit 21 and a filter capacitor 23, which are connected to antenna coil 17 and capacitor 19, provide power for the remaining circuitry of the tag 9 through lines 25 and 27, the connections of which are not shown for simplicity. The high side of the receiving coil antenna 17 is connected via a line 29 to the input of a frequency dividing counter 31 as a clock signal $f_0$. The frequency dividing counter 31 produces an R.F. signal of frequency $f_0/2$ on line 33 and address signals on a plurality of memory select lines, only two of which have been shown at 35 and 37, for activating a read only memory 39, which provides a coded identifying signal comprised of a plurality of binary pulses on an output line 41. The counter 31 will continuously read out the content of the memory 39 so long as the continuous interrogator signal produced by the exciter or interrogator circuit 11, 13, 15 is being received. Lines 33 and 41 are connected to respective inputs of an exclusive OR-gate 43 which produces output pulses on a line 45 which are fed to an electrostatic or electric field antenna 47 which may, for example, be a capacitor plate but preferably is a length of wire. The coded pulses on line 41 occur at a much lower rate than the signal of frequency $f_0/2$ on line 33. The effect of exclusive OR-gate 43 is to bi-phase modulate the signal on line 33, which serves as a carrier frequency signal, with the coded pulse train on line 41, as described in greater detail in U.S. Pat. No. 4,818,855, the subject matter of which is incorporated herein by reference.

In the illustrated embodiment the line 45 is likewise connected to the gate 48 of an MOS transistor 49, for example an N channel enhancement mode transistor, having its drain 50 connected to the high side of coil 17 and its source 51 connected to ground. With this arrangement, the coded data on line 45 is simultaneously coupled to the receiving antenna coil 17 which then likewise acts as an electromagnetic transmitting coil or antenna.

The signals on line 45 fed to the electrostatic or electric field antenna 47 and to the antenna or coil 17 are picked up respectively at the interrogator/reader 5 by a receiving electrostatic antenna 52, and a receiving electromagnetic antenna or coil 53, which are connected to, the input of a common preamplifier circuit 55. The output signals from the preamplifier 55 are detected by a phase detector 57 and passed to a decoder 59 for validation. Assuming that the correct coded signal has been detected, an operating device 61 is then triggered. Operating device 61 might take many forms, such as a security device for admitting one to a secure area, a device for recording the location of the person or object carrying the tag, and the like. It should be noted, however, that although the transponder 5 of the illustrated system utilizes both electromagnetic coupling and electrostatic coupling for simultaneous transmission of an encoded identification signal to the reader portion of the interrogator/reader 5, such is not required. That is, if desired only electrostatic coupling or only electromagnetic coupling may be utilized in a known manner.

Figure 2:
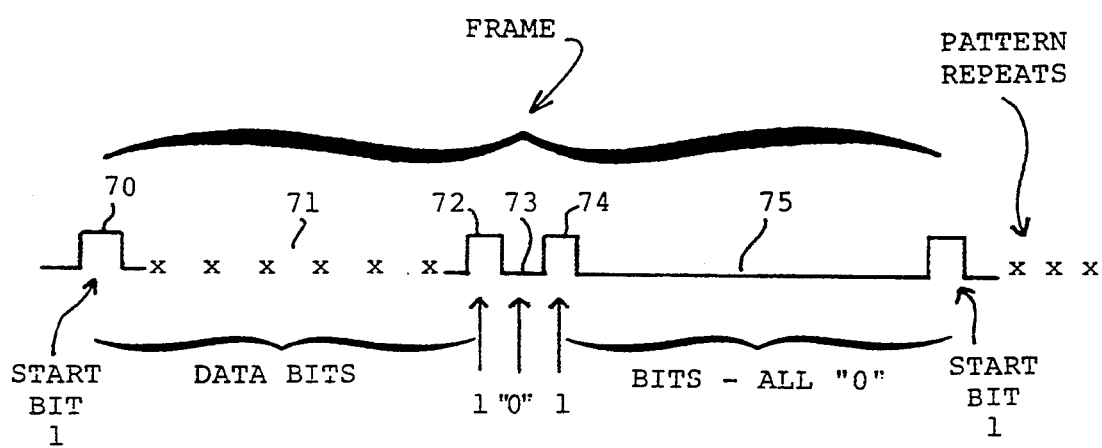
FIG. 2 is a timing diagram showing the novel and coded identification signal including the novel synchronizing pattern produced according to the invention by the transponder of the system.

Turning now to FIG. 2, there is shown the novel coded identification signal stored in and repeatedly read out of the memory 39. As shown, the stored signal or frame is comprised of a fixed number of binary bits, for example, 64 bits or 128 bits, including a single start bit 70 of a first binary value, a binary "1" as shown, followed by a data portion 71 with a specified number of binary data bits which, although shown schematically, are coded according to an identification value which identifies the transponder, followed by a synchronizing portion. The synchronizing portion consists of three consecutive bits 72-74 with alternating binary values, i.e. "1", "0", "1", with the first and third bits 72 and 74 having the same binary value as the start bit 70, and with the remaining bits of the synchronizing pattern, and thus of the frame, being constituted by bits all having the same binary value as the bit 73, i.e. all of the binary value "0". The length of the data bit portion 71 is less than one half of the total number of bits in the frame, and in the preferred embodiment is one bit less than one half of the total number of bits in the frame so that the sum of the start bit 70 and the data bits 71 is equal to one half of the total number of bits in the frame, i.e. 32 bits in the case of a 64 bit frame. Consequently, the synchronizing patterns 72-75 likewise contains one half of the total number of bits in the frame in the preferred embodiment. It should be noted, however, that although this arrangement is preferred, it is not absolutely necessary. For example, the number of bits 75 all with the same binary value "0" may be increased up to one half of the total number of bits in the frame. However, this of course reduces the number of available data bits 71 for identification purposes. It should further be noted that although the start bit 70 has been shown as the first bit of the frame, it is understood that, since the frame is continuously repeated by the transponder, the start bit 70 may likewise be considered to be the last bit of the frame, and thus to constitute part of the synchronization pattern. In any case, the total fixed pattern of the frame with the related binary values, i.e. the start bit 70, the three consecutive alternating binary valued bits 72-74 and the following plurality of bits 75 with the same binary value, provide a unique synchronization pattern which is relatively simple to generate and to detect even in the presence of noise, and which is most difficult to falsify as a result of noise.

In the decoder 59, the demodulated repeated frame of the identification signal are continuously searched for the presence of the synchronization pattern and only if the entire pattern is present with the relative polarities or binary values, i.e. the bit 70, 72-74 and the designated number of bits 75, is the data following the start bit 70 considered to be valid and read. If the synchronization pattern is not found, the demodulated data stream is continually searched for the synchronization pattern by shifting the stream bit by bit until an entire frame has been compared, i.e. a possible 64 comparisons in the case of a 64 bit frame. It should further be noted that, depending on the particular type of modulation and demodulation scheme utilized, it may be that the polarity information is lost and thus the polarity of the demodulated data stream may be reversed. Accordingly, if the synchronization pattern is not found after a maximum number of bit sequence comparisons, i.e. a number of comparisons equal to the total number of bits in the frame, preferably the polarity of the demodulated data signal is reversed and searched again for the presence of the synchronization pattern.

The invention now being fully described, it will be apparent to one of ordinary skill in the art that any changes and modifications can be made thereto without departing from the spirit or scope of the invention as set forth herein.

What is claimed:

1. A transponder for use in an object identification system including an interrogator which transmits a continuous interrogation signal and detects a responsive identification signal transmitted by the transponder, said transponder comprising:

means for receiving and detecting said interrogation signal;

means, responsive to receipt of said interrogation signal, for continuously producing an identification signal having a frame with a fixed number of binary bits including a start bit corresponding to a first binary value, an identification data portion of a specified number of bits less than one half of said fixed number of bits, and a following synchronization portion including first, second and third consecutive bits of alternating binary values, with said first and said third bits being of said first binary value and said second bit being of a second binary value, followed by a sequence of bits which are all of said second binary value to complete said frame;

means for producing a carrier signal; and means for modulating said carrier signal with said identification signal and for transmitting the modulated carrier signal.

2. A transponder as defined in claim 1 wherein said bits in said synchronization portion constitute at least one half of said fixed number of bits of said frame.

3. A transponder as defined in claim 2 wherein said frame includes a fixed even number of bits and said start bit and said specified number of bits in said identification data portion constitute one half of said fixed number of bits and is equal to the number of bits in said synchronizing portion.

4. A transponder as defined in claim 3 wherein said first binary value is a binary 1.

5. A transponder as defined in claim 3 wherein said fixed number of bits is equal to 64.

6. A transponder as defined in claim 3 wherein said fixed number of bits is equal to 128.

7. A transponder as defined in claim 1 wherein: said interrogation signal is a signal of a first predetermined frequency; said means for producing a carrier signal produces a carrier signal which is equal to one half of said first predetermined frequency; and said means for modulating comprises a phase modulator.

8. A transponder as defined in claim 7 wherein: said means for continuously producing an identification signal comprises a memory in which said identification signal is stored, and a frequency divider having an input connected to said means for receiving, and having outputs connected to address lines of said memory; and said phase modulator is an exclusive OR-gate having an input connected to receive said carrier signal and a second input connected to an output of said memory.

9. A transponder as defined in claim 7 wherein: said means for producing a carrier signal comprises a frequency divider; and said phase modulator comprises an exclusive OR-gate having one input connected to an output of said frequency divider and a further input connected to the output of said means for continuously producing an identification signal.

10. A transponder for use in an object identification system including an interrogator which transmits a continuous interrogation signal and detects a responsive identification signal transmitted by the transponder, said transponder comprising:

means for receiving and detecting said interrogation signal;

means, responsive to receipt of said interrogation signal, for producing a repeating identification signal having a fixed number of binary bits consisting of an identification data portion of a specified number of consecutive bits less than one half of said fixed number of bits, and a synchronization pattern of consecutive bits consisting of first, second and third bits of alternating binary values, a consecutive sequence of a plurality of bits which are all of the same binary value as said second bit, and a single bit of the same binary value as said first and third bits;

means for producing a carrier signal; and means for modulating said carrier signal with said identification signal and for transmitting the modulated carrier signal.

11. A transponder as defined in claim 10 wherein said first, second and third bits and said sequence of a plurality of bits constitute one half of said fixed number of binary bits of said identification signal.

12. A transponder as defined in claim 11 wherein said binary value of said first bit is a binary 1.

13. In a method of identifying an object comprising the steps of transmitting a continuous interrogation signal from an interrogator installation, detecting said interrogation signal at a transponder in the proximity of said interrogator installation, and producing an encoded identification signal in the transponder and transmitting same to a reader at the interrogator installation; the improvement wherein: said step of producing an encoded identification signal comprises continuously generating an identification signal having a fixed number of binary bits consisting of an identification data portion of a specified number of consecutive bits less than one half of said fixed number of bits, and a synchronization pattern of consecutive bits consisting of first, second and third bits of alternating binary values, a consecutive sequence of a plurality of bits which are all of the same binary value as said second bit, and a single bit of the same binary value as said first and third bits.

14. A method as defined in claim 13 wherein said first, second and third bits and said sequence of a plurality of bits constitute one half of said fixed number of binary bits of said identification signal.

* * * * *